Patented May 20, 1947

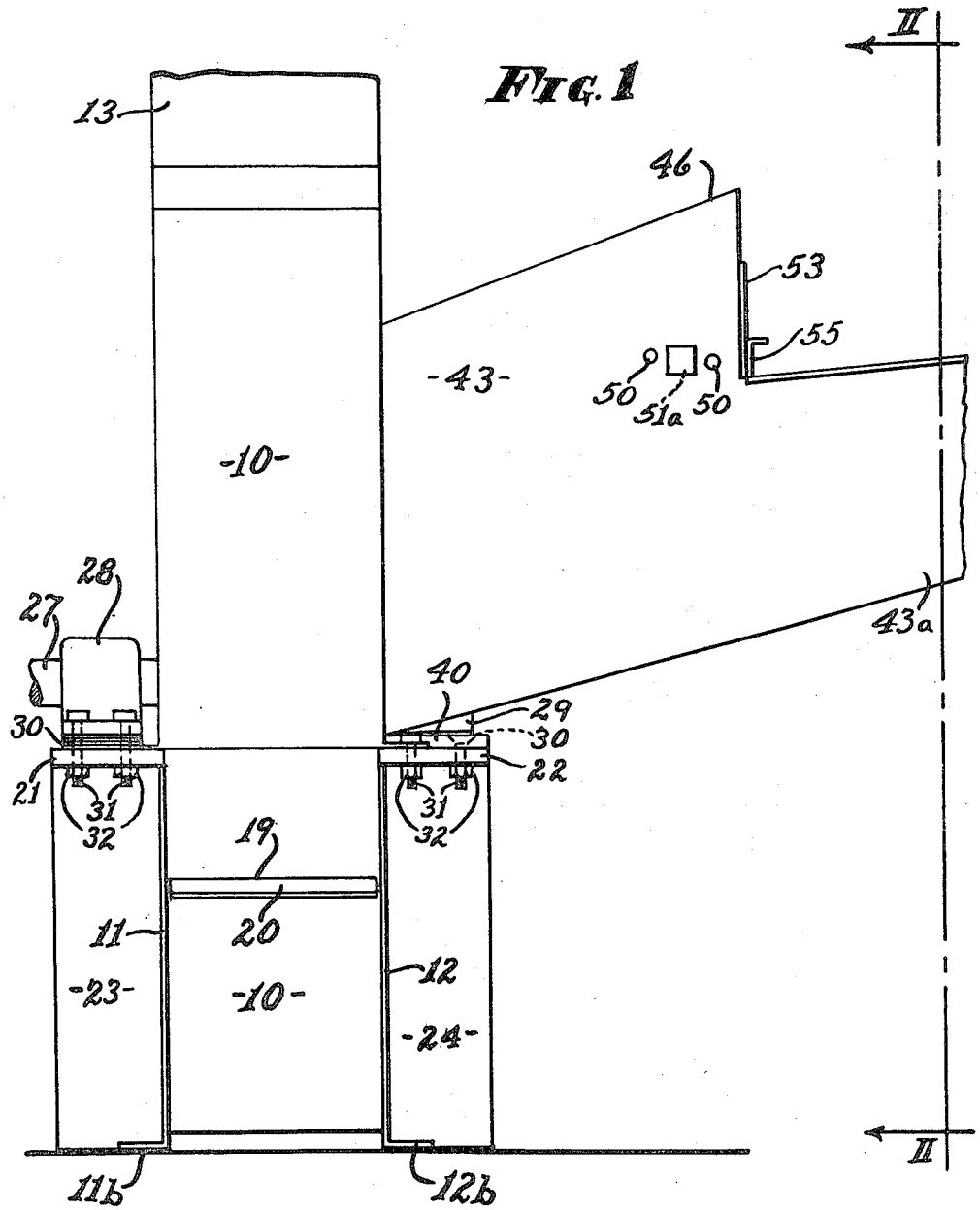

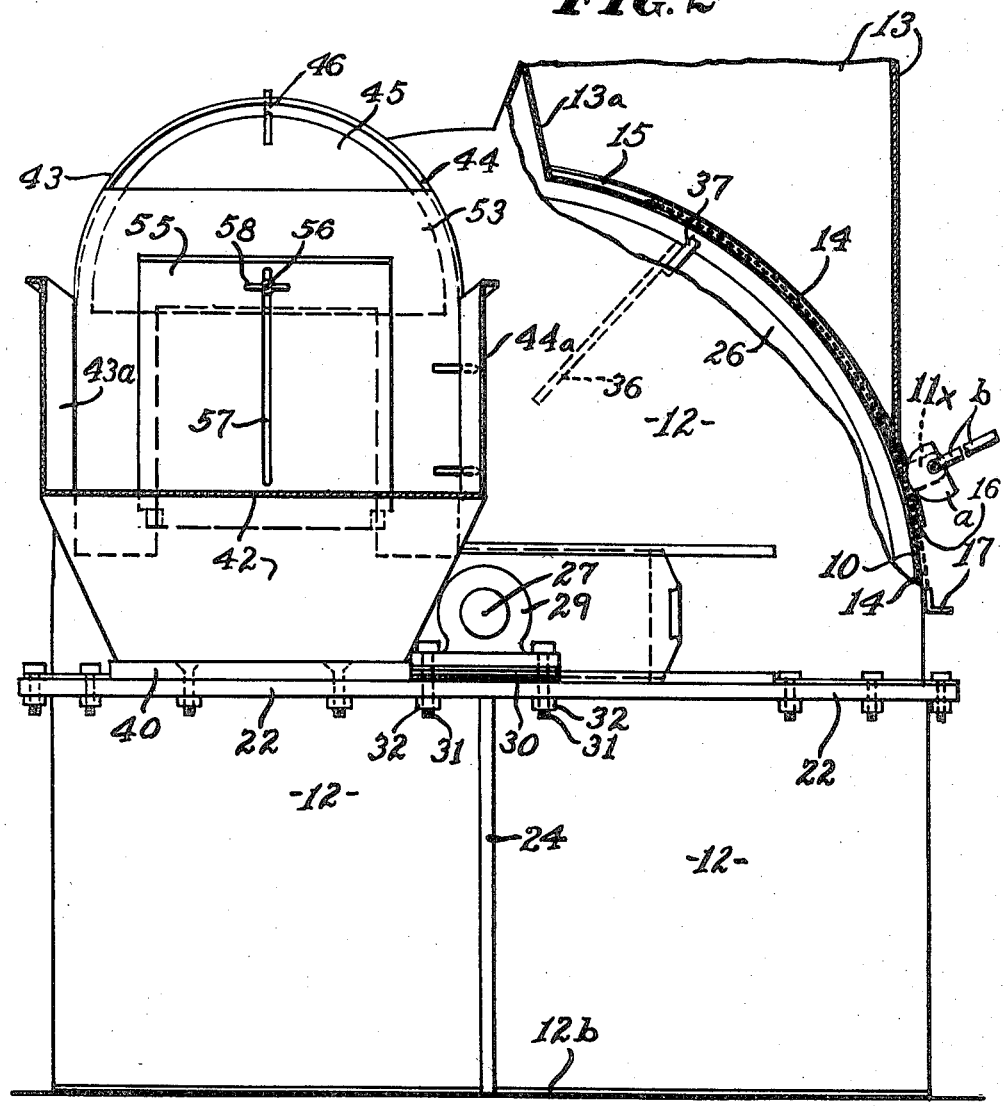

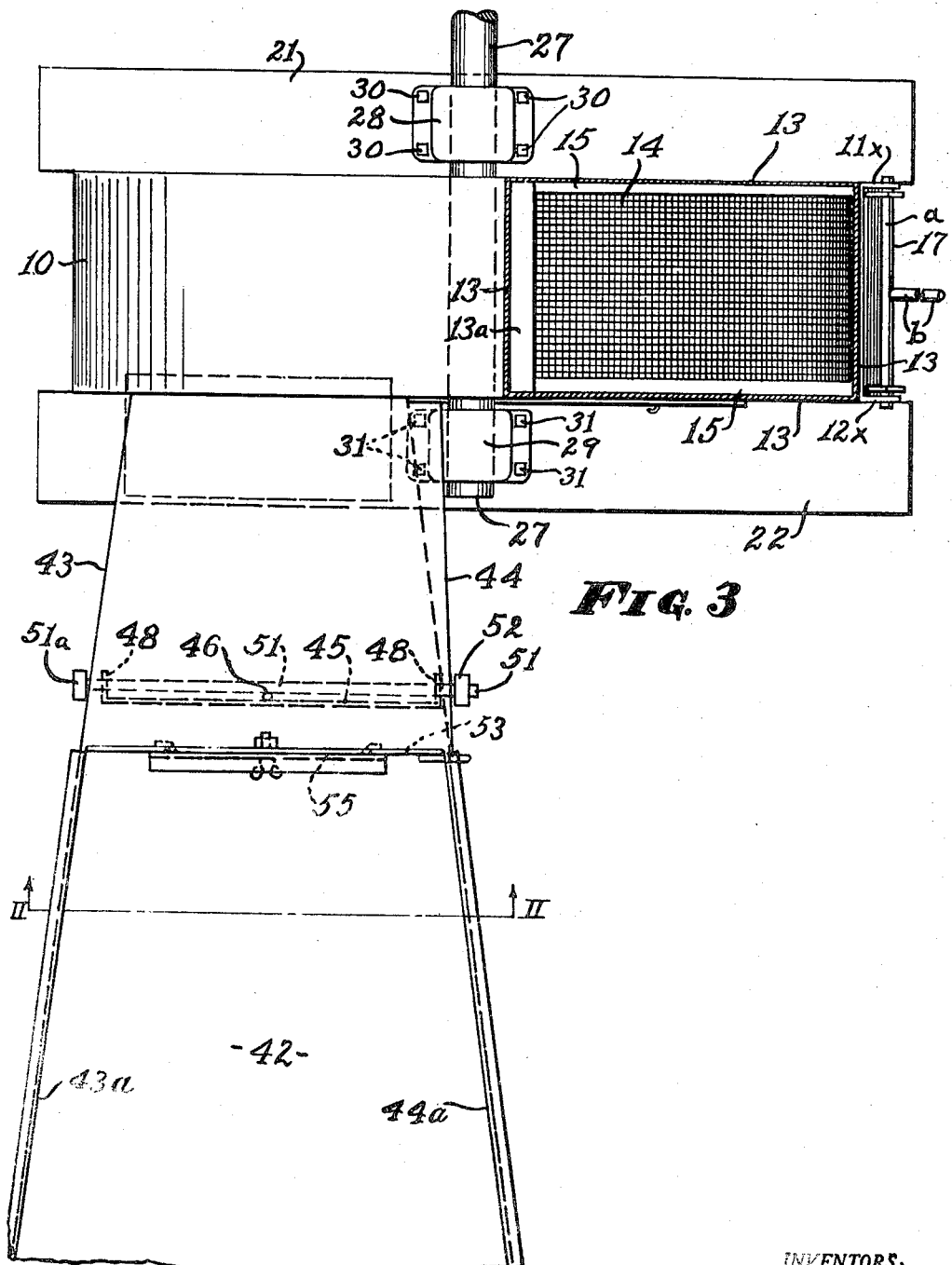

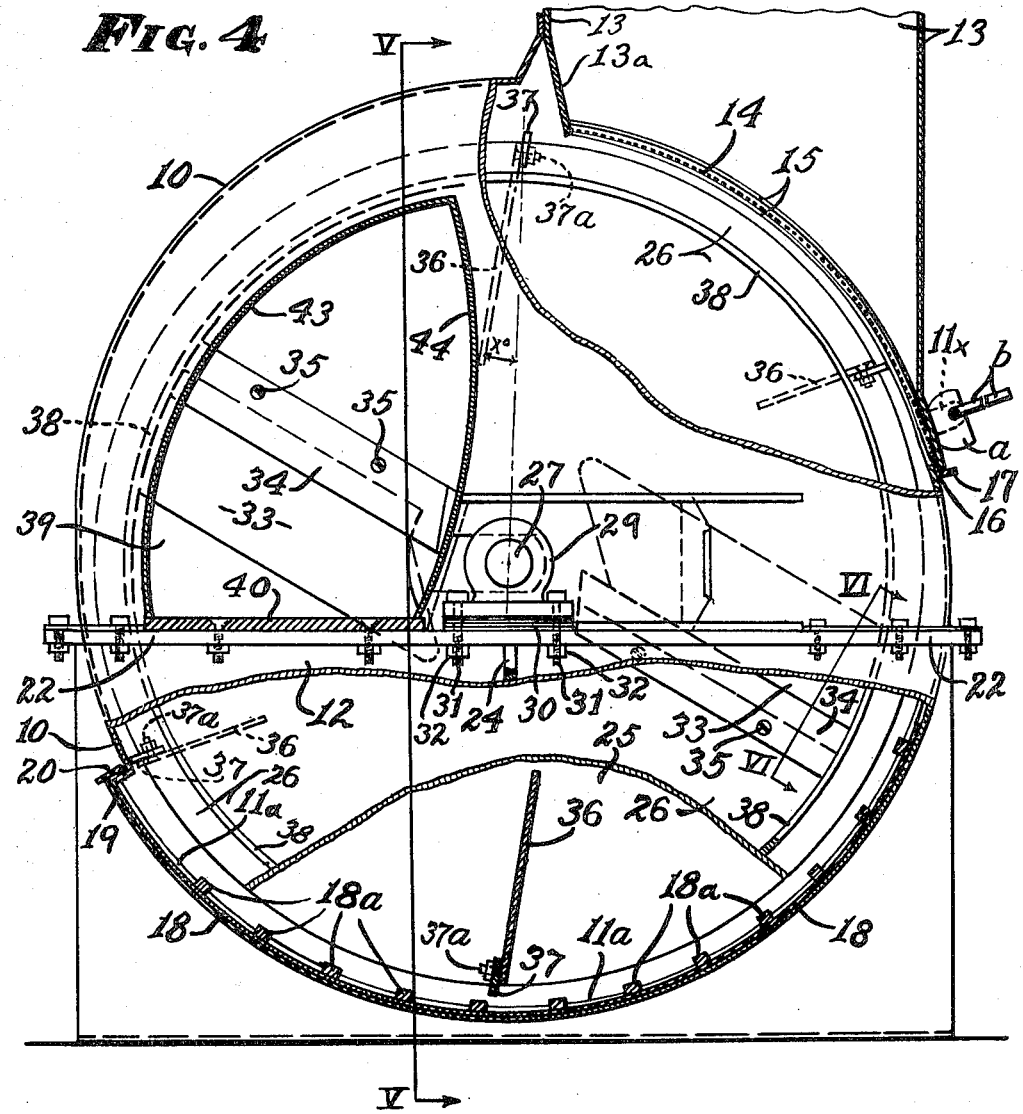

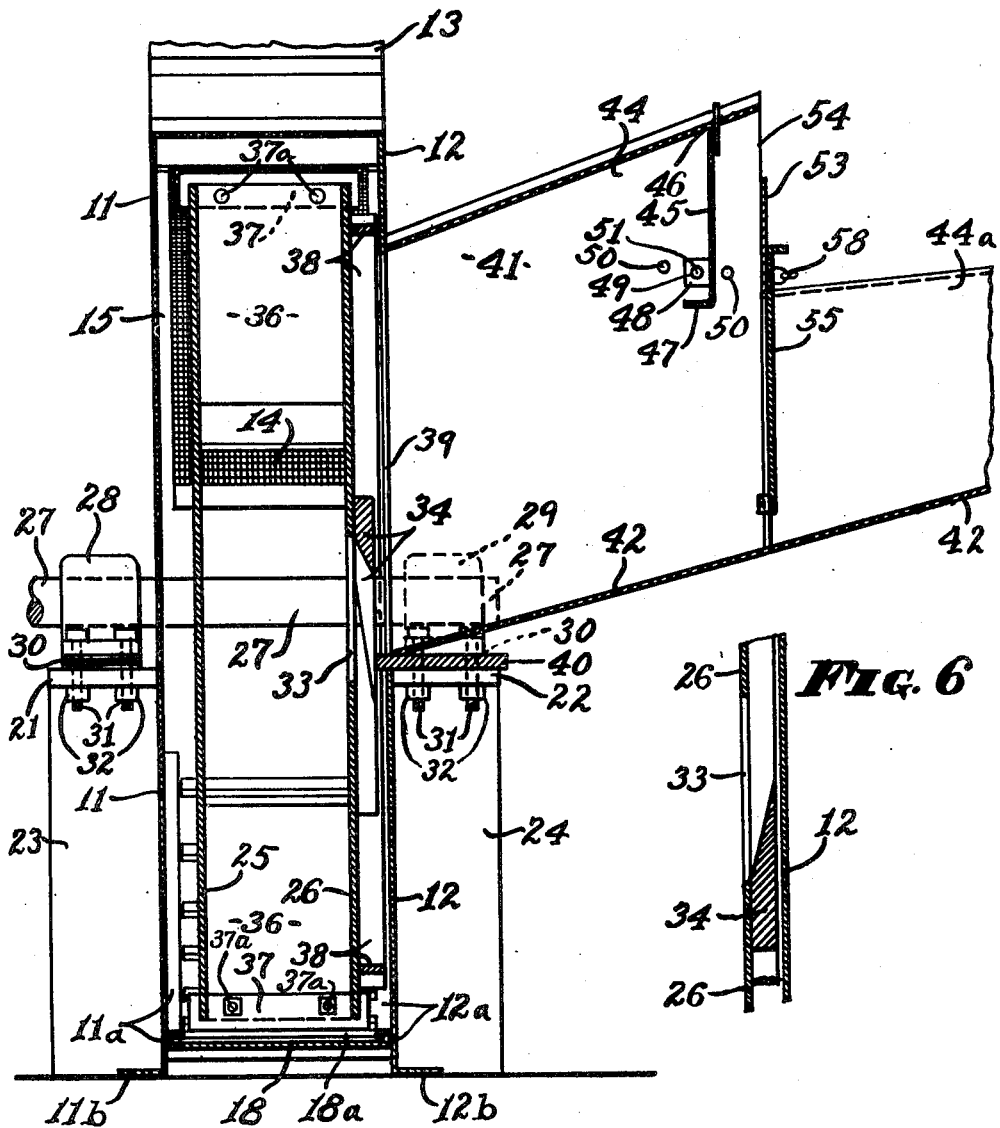

2,420,966

UNITED STATES PATENT OFFICE 2,420,966

GRAIN AND ROUGHAGE CUTTER AND GRINDER

August W. Molz and James H. Parvin, Wichita, Kans.

Application October 21, 1944, Serial No. 559,812

4 Claims. (Cl. 146—107)

Our invention relates to improvements in grain and roughage grinders and particularly to improvements to the type of grinder. The material, to be ground, enters or is fed in from the side from a hopper, and knives, hammers, concaves and perforated metal screens are used in the reduction process. The object of the invention is conversion of the implement thereby adapting it quickly for many different and distinct operations. For example, by a quick change, removing screens and concaves the implement is converted to a pneumatic elevator to be used to elevate silage from conventional field ensilage cutters into silos, or the machine can be used as an ensilage cutter to make ensilage from green forage and elevate same into silos, and then by the quick simple insertion of suitable concaves the implement is converted to a roughage grinder for processing wet, green or dry roughage, either loose or in bundles to the desired degree of fineness and in the same operation elevate the product into a wagon, truck, bin or hay mow as desired. By other quick changes that can be made, the farmer has an alfalfa or other kind of hay grinder, regardless of whether the hay is loose or baled, grinding the same to the desired degree of fineness and at the same time elevating the product into the desired receptacle. Then again the implement, by a quick change of concaves and screens, is converted to a grinder for processing the small grains, such as shelled corn, corn on the cob, etc., to the desired degree of fineness and elevating the product as desired; also the implement may be used as a feed mixer.

The purpose of the invention is to combine in one economical investment and in one unit, a many purpose implement that will perform all the various operations more efficiently with less power required and less up-keep expense than any other conventional limited purpose grinders that are now available.

These and other objects will be more fully explained as this description progresses.

Now referring to the accompanying drawings:

Fig. 1 is a front view of our improved grain and roughage grinder.

Fig. 2 is a sectional and side view of the right side of our improved grain and roughage grinder, the view being taken from the line II—II in Figures 1 and 3, and looking in the direction of the arrows.

Fig. 3 is a top plan view of our improved grain and roughage grinder.

Fig. 4 is a detail side view of the right side of our improved grain and roughage grinder, the hopper being removed, and parts being broken away for convenience of illustration.

Fig. 5 is a cross sectional detail view of our improved grain and roughage grinder, the view being taken from the line V—V in Fig. 4 and looking in the direction of the arrows.

Fig. 6 is a detail sectional view through one of the knife sections of the machine, the view being taken along the line VI—VI in Fig. 4 and looking in the direction of the arrows.

Similar numerals of reference designate the same parts throughout the several figures of the drawings.

In the drawings is shown our improved grain and roughage grinder as having a curved rotor housing 10 and side walls 11 and 12, therefor, that merge into a blower discharge housing 13, the inner opening of which is covered by a screen 14 that is curved to conform to the curved housing 10 the lower portion 13a of the front will later be explained. The screen 14 is carried in curved channels 15 that are rigidly attached to the inner face of the side walls 11 and 12 at the discharge opening space of the blower. The screen 14 is removable from, and insertable into the machine, in the direction of the rotor that will later be described, through a slot 16 in the rear side of the curved housing 10 at a point immediately below the blower discharge opening. The screen is provided with an outwardly turned lip 17 by which the screen 14 may be pulled from, or pushed into place in the machine. This screen 14 is removable, or replaceable with variable size mesh screen to suit the requirements of the kind of a job that is to be done.

The upper rear portion of the side plates 11 and 12 are provided with outwardly and upwardly directed ear-like elements 11x and 12x, between which is positioned a bar a that is cam shaped in cross section and the ends of which are pivotally carried by the earlike elements 11x and 12x. Rigidly attached to the cam bar a is an outwardly extending handle element b by which the cam bar a may be rocked into and out of engagement with the screen element 14 so that the screen 14 may be set at variable positions to open or close any desired portion of the discharge opening into the discharge tube 13 for purposes that will later be explained. The lower end of the screen 14 passes between the cam bar a and over the curved housing plate 10 so that as the cam bar a is rocked by the lever arm b, the screen 14 will be locked in its adjusted position.

The machine is also provided with a removable, and exchangeable concave 18 that is positioned in the lower and rear portion of the machine, the concave 18 being curved to fit the curve of the enclosing wall 10 and being carried in a channel formation 11a and 12a on the side walls 11 and 12 of the housing. The concave is removable and insertable into the machine, in the direction of rotation of the rotor that will later be described, through a slot 19 in the front of the curved housing plate 10. The concave 18 is provided with a lip 20 by which the concave 18 may be pulled from or pushed into the machine. The lip 20 also serves as a tight closure of the slot 19 when the concave 18 is in place. The concave 18 is provided with suitable slots, ribs, or rasps 18a, depending on the job that is to be done. Several concaves with variable style ribs 18a may be provided, and the concaves may be substituted one for another in the manner above described.

The machine is provided with two horizontal frame members 21 and 22 that are positioned one on each side of the machine and rigidly attached to the side walls 11 and 12 of the machine, preferably by being welded thereto, and the frame members 21 and 22 are positioned a little below the center of the curved housing 10—11—12. The machine is also provided with a pair of vertically positioned frame members 23 and 24 that rigidly join the horizontal frame member 21 and 22 at their central portion and extend downwardly to and join with supporting foot elements 11b and 12b which are outwardly turned bottom edges of the side walls 11 and 12, this construction forms a rigid frame and support for the machine.

In the housing 10—11—12 is a rotor element having circular side walls 25 and 26 that are rigidly attached to and supported by an axle shaft 27 that is revolvably supported in suitable bearings 28 and 29 that are adjustably mounted on the horizontal frame members 21 and 22. The adjustment of the bearings 28 and 29 is made by the use of, and the insertion or removal of all or a part of a plurality of thin shims 30, whereby the bearings 28 and 29 and axle shaft 27 and rotor 25—26 thereon may be moved up or down to increase or decrease the relative position of the rotor 25—26 to the concave 18—18a. In addition to the adjustment just described, the bearings 28 and 29 may be moved longitudinally along the frame members 21 and 22 and locked in this adjusted position by tightening the bolts and nuts 31 and 32 as will readily be understood. This adjustment also adjusts the relative position of the rotor 25—26 to the concave 18—18a.

Referring to Fig. 4, the rotor 25—26 rotates in an anti-clockwise direction and the rotor wall 26 is provided with a plurality of slots 33, the trailing edges of which are radially disposed in the wall 26, and at the trailing edge of each of the slots 33 is rigidly attached a knife blade 34 by means of screws 35 or any other suitable method of attachment.

Interposed between the rotor walls 25 and 26, and between the successive slots 33 is a blower plate 36, the outer edge of which is provided with any desired type of a bar, knife or rasp, or the like 37 which shears against, or clears the concave ribs 18a in accordance with the adjustment thereof.

On the outside of the rotor wall 26 is a sealing ring 38 that is rigidly attached, preferably by welding, to the rotor wall 26. The outer edge of the sealing ring 38 revolves with the rotor wall 26 and in close proximity with the inner surface of the housing wall 12.

The housing wall 12 is provided with a large opening 39, the bottom of which extends from the sealing ring 38 along the top edge of the frame member 22 to a point adjacent the bearing block 29, then the opening 39 extends in a curved line upwardly and toward the vertical axis of the machine to a point adjacent the bearing block 29, then the opening 39 extends in a curved line upwardly and toward the vertical axis of the machine to a point adjacent the sealing ring 38, and thence downwardly in an arc following the sealing ring 38 to the frame member 22 to form the large three cornered opening 39 in the upper left hand portion of the housing wall 12.

Rigidly attached to the frame member 22 is a shear plate 40 that spans the width of the opening 39, and against which shears the sharp edge of the knife blades 34 as the rotor 25—26 revolves.

Rigidly attached to the side wall 12 and the shear plate 40 is a hopper 41 that has a bottom 42 that is inclined downwardly toward the bottom of the opening 39, and has side walls 43 and 44 that follow the contour of the sides of the opening 39 and meet at the top the same as the edges of the wall defining the opening 39 and as the hopper walls and bottom, just described, progress outwardly from the housing wall 12 they merge into an open top trough formation having a bottom 42 and sides 43a and 44a.

At the upper and near the rear portion of the curved walls 43 and 44 is a damper door 45 that is pivotally hung at the point 46 adjacent the rear end of the walls 43 and 44. The bottom edge of the damper door 45 is turned inwardly as at 47 to form a stiffening element for the bottom edge of the damper door 45. Adjacent each lower corner of the damper door, and being formed thereon is an inwardly turned ear-like element 48 that is provided with a hole 49, the object of which will later be explained.

In the side walls 43 and 44 is a series of holes 50 that are arranged in an arc, the center of which is the pivotal point 46 of the damper door mounting. The hole 49 being so positioned that it will register with the holes 50 as the damper door 45 is swung forward or rearward, thus the damper door 45 may be swung to any selected forward or rearward position and there stationed by passing a rod 51 through the holes 50 in the side walls 43 and 44, and the holes 49 in the ears 48 on the damper door 45. The rod 51 may be provided with a head 51a and a nut 52 may be threaded on the other end of the bolt 51 to make the bolt secure from falling from its position. The object of the adjustment of the damper door 45 will be made obvious.

Spaced a short distance behind the damper door 45 and between the side walls 43 and 44, and extending upwardly from the top of the trough side walls 43a and 44a, and terminating a short distance below the joinder of the hopper walls 43 and 44 is a baffle plate 53 thereby leaving an air passage space 54 above the baffle plate 53 and between the damper door 45 and the baffle 53, said air passage 54 leading to, and supplying air into the hopper 42—43—44. The baffle plate 53 is provided with an auxiliary baffle plate 55 that is slidable up and down against the baffle plate 53 and is held in adjusted elevated positions above the trough and hopper bottom 42 by means of a bolt 56 that passes through a vertically positioned slot 57 in the auxiliary baffle plate 55, and a wing nut 58 that is threaded on the bolt 56 and bears against the auxiliary baffle plate 55 and bind it against the baffle plate 53 to maintain its adjusted position.

The axle shaft 27 is provided with any suitable pulley, gear, or other device, not shown, by which the axle 27 and rotor 25—26 may be rotatably driven as will be readily understood.

The sealing ring 38 has several functions, all of which are important. In mills of this type it is a common thing for dust and ground particles cut and ground by the mill to blow up past the rotor and out of the feed opening in the housing wall and on to the operator of the machine to such an extent that it is almost impossible for a man to stand at the mill and feed the material to the mill that the mill is to cut or grind. It has been found that the sealing ring seals off this draft of dust and cut or ground material ladened draft of air and this trouble is therefore eliminated.

It also happens that in mills of this type some particles or small pieces of the material being cut by the knives of the mill fall between the rotor and the adjacent housing wall and will not pass on through the mill. In our mill this material falls on the sealing ring 38 which is revolving, therefore the material falling thereon is not allowed to pile up and clog the mill or be blown out through the feed opening as above described, instead, the sealing ring keeps this material on the move and as the knives rotate they will strike this material and shear it into the interior of the rotor from where it passes on through the mill in the normal manner.

In view of the fact that the sealing ring 38 prevents the back draft, it is possible to make an extremely large feed opening 39 and still avoid the obnoxious and troublesome back draft with the dust and dirt, etc., that comes with it.

By being able to have the large feed opening 39 it then becomes possible to feed more bulky material such as large fork fulls of hay or straw, or large bundles such as binder bundles of straw and grain, or large tightly packed bundles such as sections of bailed hay and the like. While the machine can be used as just described, it is also practical for use in cutting and grinding corn stalks, and the sorghum classes of grains.

Because of the back draft, as above mentioned, in other mills of this type the feed opening has to be made as small as possible and this, of course, eliminates the mill from use where the large feed opening is necessary. This marks a big advantage our mill has over mills of this type.

Another big advantage our mill has over other mills of the type is the case with which the concave 18 can be removed from the machine and replaced with another that is better adapted for the job that is to be done. Also the possibility of changing the screen 14 in a manner similar to that of the concave 18 is new and advantageous as above described.

Another feature of importance is the fact that all four edges of the cutter blades 37 are sharp, and as the mill runs, the cutting edge being used will eventually become dulled. The bars 37 are positioned on the back edge of each blower plate 36 with the ends of the bar resting in slots 25a and 26a in the rotor walls 25 and 26 with the extreme end portion of the bars 37 extending outwardly a short distance beyond the rotor walls 25 and 26. The bars 37 are rigidly attached to the blower blades 36 by means of bolts 27a that pass through the blade 36 and bar 37, there being a nut 37b threaded on each bolt 37a to rigidly bind and hold the bars 37 on their respective blower blade 36. The bars 37 are set in the slots 25a and are therefore provided with a rigid seat to help retain the bars 37 in their correct positions. Now by taking the blade 37 off and turning it around, a new sharp cutting edge is presented, then when the second butting edge is dulled, the blade 37 may be turned over which presents a third cutting edge, and then the blade may be again turned around whereby a new fourth sharp cutting edge is presented. This is a new feature characteristic to our machine and is not found in other machines of this type.

A still further feature of advantage in our mill is the fact that the side plates 11 and 12 and curved housing 10 are in two pieces and divide at the horizontal frame members 21 and 22 so that the top half of the housing 10—11—12 can be easily and quickly removed which affords easy and quick accessibility to the interior of the mill.

In using the mill the material to be ground or cut is placed in the trough 42—43a—44a and moved under the auxiliary baffle plate 55 into the hopper 42—43—44 and through the feed opening 39 and against the revolving rotor wall 26 whereupon the sharp edge of the knives 34 strike and cut the material in short lengths and feed them through the slots 33 into the space between the rotor walls 25 and 26 whereupon the cut material is thrown to the outside of the rotor and against the concave 18—18a whereupon the cutter blades 37 strike and grind the cut material between the cutter blades 37 and the elements of the concave 18—18a. During this action, air passes through the opening between the damper door 45 and the baffle plates 53—55 and through the hopper cavity and through the feed opening 39 into the interior of the mill, through the rotor slots 33 into the rotor wherein the draft of air pick up the cut and ground material and passes out through the screen 14 and blower discharge opening 13, except for some pieces that may be too large to pass through the screen 14, these will fall back, or be driven back into the rotor whereupon they will undergo a further cutting and grinding into smaller pieces until they too will pass through the screen and out the discharge opening 13 and be carried to a suitable place of deposit such as a silo, bin or other receiving receptacle. The draft of air above mentioned is created by the blower blades 36 in the rotor as the rotor revolves, and the amount of air passing through the machine is governed by adjusting the damper door 45 toward or away from the baffle plate 53 as above described to increase or decrease the size of the air passage between the damper door 45 and the baffle plate 53.

The inclined wall 13a functions as a means of directing the draft of air, produced by the blower blades 36, upwardly through the discharge tube 13 and produces a scouring action on the blower blades 36 so that material that may be lodged on the blower blade 36 will leave the blower blade more readily and pass on up the discharge tube 13.

In view of the foregoing information it is seen that the machine is unusually flexible and adaptable to an extremely wide range of uses and works equally well under all conditions.

There may be occasions where it would be desired to use the machine as a blower, or to elevate already prepared materials into a bin or silo, and in this case, the screen 14 would be entirely removed, also the concave 18—18a could be removed. This being done, the material to be moved could be placed in the hopper 42—43—44 and fed through the opening 39, against the rotor plate 26 and through the openings 33 therein into the rotor 25—26, whereupon the material will be driven in a circular movement so that the centrifugal force of the movement plus the draft of air being passed through the machine will cause the moving material therein, and being fed thereinto to move rapidly through the machine and be discharged through the discharge passage 13 and any tubular extension thereof to and into any desired bin, silo or the like.

Now having fully shown and described our invention, what we claim is:

1. In a grain and roughage grinder; a housing, said housing having an intake opening in one of the side walls thereof, and a discharge opening in another of the walls thereof, a two walled rotor, and frame elements, said rotor being revolvably positioned within said housing and revolvably carried by the frame elements, the rotor wall adjacent the intake opening having comparatively large openings therein, knives, said knives radially positioned on the rotor and placed one at the trailing edge of each opening in the rotor plate, a shear plate, said shear plate being supported by one of the said frame elements and spanning the width of the intake opening and being in position for the said knives to shear there against, a sealing ring, said sealing ring spanning the space between the rotor and the housing wall having the intake opening therein and being positioned intermediate the outer edge of the rotor plate and the said openings therein, and plate means between said rotor walls for moving air inwardly through said intake opening and openings in said rotor wall, and discharging the air through the discharge opening, and hopper means for feeding material to and through said intake opening.

2. In a grain and roughage grinder as defined in claim 1, said rotor being mounted on a drive shaft carried in bearings mounted on the horizontal members of said frame, and means for shifting said bearings on said frame to change the position of the rotor relative to the concave and the screen over the discharge opening, and means for raising and lowering said drive shaft bearings for further adjustment of the rotor relative to the said concave and screen.

3. In a grain and roughage grinder; the combination of a housing formed of a curved housing element and side closure plates, an upwardly directed discharge tube at the rear of and opening into the said housing, a concave in said housing, said concave being removable from and insertable into said housing through a slot in the curved wall portion of the housing, a screen in said housing, said screen being positioned across the discharge opening of the grinder, said screen being removable from and insertable into said housing through a slot in the curved wall portion of the housing, and means for holding and locking the said screen in adjusted positions, whereby the discharge opening of the grinder may be only partially covered by the screen, one of the side walls of the housing having a large feed opening therethrough, frame elements, said frame elements being positioned one on either side of the housing, a shear plate, said shear plate being supported by one of the said frame members and being positioned across the bottom of the feed opening, a rotor in said housing, said rotor having two walls that are spaced apart and supported on and are rigidly attached to a revolvable drive shaft, said drive shaft being revolvably carried in bearings that are supported on the said frame elements, and means for adjusting said bearings both vertically and horizontally for adjusting the position of the rotor relative to the said concave and screen, the axis of the drive shaft being positioned out of alignment with the said shear plate, knives, said knives being rigidly attached to, and having the cutting edges thereof radially positioned on the rotor wall adjacent said shear plate, said knives being adapted to shear against the edge of the shear plate, the knife carrying rotor wall having large openings therein, each of which extend from its respective knife to a line well in advance of the cutting edge of the knife, a sealing ring, said sealing ring being positioned concentric to and adjacent the outer edge of the rotor and filling the space between the knife carrying rotor wall and the adjacent parallel housing wall, impeller plates, said impeller plates being positioned between and being rigidly attached to the rotor walls, cutter and grinder bars, said cutter and grinder bars being carried by the rotor and brought into close proximity with the concave and screen as the rotor revolves, a hopper and material feed trough, one end of said hopper connecting with the housing wall leaving the feed opening therein and registering with the said feed opening, the other end of the hopper having an adjustable feed valve for the reception of material into the hopper, said hopper also having a damper therein for governing the amount of air admitted to flow through the grinder machine, said trough being a continuation of a portion of the hopper as a means of feeding material to the hopper.

4. In a grain and roughage grinder as defined in claim 1; a portion of the hopper adjacent the housing being closed by the bottom and sides of the hopper and a top cover therefor, and being open at the outer end thereof, a partial closure element for the open end of the hopper closure, and a valve plate, said valve plate being adjustably attached to the closure plate to vary the size of the opening into the closed portion of the hopper, a damper, said damper being swingably positioned in the upper front portion of the closed portion of the hopper, said damper being swingable toward and away from the said closure plate to adjust the amount of air permitted to flow into the closed portion of the hopper, and means for locking the damper in its adjusted positions all as shown and for the purpose described.

AUGUST W. MOLZ.
JAMES H. PARVIN.

REFERENCES CITED

The following references are of record in the file of this patent:

UNITED STATES PATENTS

| Number | Name | Date |
|---|---|---|
| 2,026,426 | Matejcik | Dec. 31, 1935 |
| 2,181,397 | Everett | Nov. 28, 1939 |
| 2,004,753 | Gredell | June 11, 1935 |
| 1,461,764 | Silver | July 17, 1923 |
| 1,046,449 | Dick | Dec. 10, 1912 |
| 1,928,887 | Gredell | Oct. 3, 1933 |
| 1,476,177 | Plaisted | Dec. 4, 1923 |